Reissued Oct. 8, 1946

Re. 22,800

UNITED STATES PATENT OFFICE 22,800

METHOD FOR THE CATALYTIC DEHYDROGENATION OF HYDROCARBONS

Kenneth K. Kearby, Cranford, N. J., assignor to Standard Oil Development Company, a corporation of Delaware No Drawing. Original No. 2,370,797, dated March 6, 1945, Serial No. 456,266, August 26, 1942. Application for reissue July 19, 1946, Serial No. 684,763

5 Claims. (Cl. 260—669)

This application contains a disclosure similar to that contained in the application of Kenneth K. Kearby filed February 14, 1942, and assigned Serial No. 430,873.

My present invention relates to catalytic dehydrogenation of hydrocarbons, and more particularly, it relates to improved catalysts for dehydrogenating olefins and aralkyl hydrocarbons, and to methods for preparing the said catalysts.

My present invention is particularly adapted to the dehydrogenation of low molecular weight olefin hydrocarbons having from 2 to 10, preferably 2 to 6, carbon atoms, but is also applicable to dehydrogenation of aralkyl hydrocarbons, such as ethyl and propyl benzene to form styrene and phenyl, methyl ethylenes, and to convert isopropyl benzene to methyl styrene.

Recently, processes designed to convert butene to butadiene have become of increased importance due to the fact that butadiene is an essential intermediate in one of the more important methods for the production of synthetic rubber-like materials.

In the production of diolefins from olefins by the catalytic dehydrogenation of mono-olefins, it is, of course, desirable to obtain as high a yield of the diolefin as possible per one passage of the butene through the dehydrogenation zone, and as a corollary to the purpose, it is also a desideratum to this type of process to obtain as small an amount as possible of by-products. It is also desirable to conduct the dehydrogenation under such conditions that the fouling of the catalyst is minimized to as great an extent as possible. The efficiency of the catalyst is best measured in terms of per cent selectivity, which means the per cent of the total amount of initial material which undergoes conversion, which is converted to the desired product. For example, if 50% of the initial material undergoes conversion of some sort, and 30% of the initial material is converted to the desired product, then the per cent selectivity would be 60.

I have now discovered a new type of catalyst which when used under certain conditions in the dehydrogenation of hydrocarbons makes it possible to obtain substantially greater yields of the desired dehydrogenation product than can be obtained by the use of previously known catalysts. The nature of this new type of catalyst and the conditions under which it is used will be fully understood from the following description.

In the above referred to Kearby application, there is disclosed a dehydrogenation catalyst which comprises magnesium oxide as a base material, iron oxide as an active ingredient, and a small amount of a promoter which consists of an alkali or an alkaline earth oxide. In addition, the catalyst may contain a small amount of a stabilizer which stabilizer may consist of an oxide, of a metal of the right-hand side (transition series) of groups I, II, and III of the periodic system or certain non-acidic oxides.

As pointed out in the aforesaid prior Kearby application, the principal function of the promoter in these catalysts is to increase the dehydrogenating activity of the catalyst. The principal function of the stabilizer, when used, is to prevent the promoter from volatilizing or becoming inactive.

Now in my present application, I propose to use as a base, zinc oxide, and this material should constitute the major portion of the entire catalyst composition. The following table gives the range of each component which may be used:

*Table*

| Component | Parts by weight |
|---|---|
| ZnO | 50–97 |
| $Fe_2O_3$ | 3–50 |
| Promoter | 5–15 |
| Stabilizer | 1–15 |

Among the alkali metal and alkaline earth oxides which may be used as promoters, are the oxides of calcium, sodium and strontium, but potassium oxide is greatly superior.

However, I wish to point out that some of the desired conversion is obtained by omitting the promoter and the stabilizer and compounding the catalyst only from the base and the active ingredients. The presence of silica gel amounting to 1% by weight of the total catalyst containing the four components mentioned above and silica, improves the activity of the catalyst.

The following stabilizers give good results: Oxides of metals of the right-hand side (transition series) of groups I, II, and III of the periodic system, particularly oxides of copper and silver, non-acidic transition oxides of chromium, manganese, cobalt and nickel; and non-acidic oxides of zirconium, cerium, lead, bismuth, and particularly aluminum and thorium.

In place of the iron oxide, manganese oxide and chromium oxide may be used to give good catalysts, and oxides of cobalt and nickel give less selective catalysts.

A comparison of catalysts containing these latter active constituents is shown in the following Table A:

*Table A*

[Butene dehydrogenation at 2100° F., feed rate—800 volumes butene/vol. catalyst/hr.; 7 vol. steam/vol. butene. Catalyst contains in parts by weight 80ZnO; 5CuO; 5$K_2O$; 20 oxides listed below]

| | Active oxides | | | | |
|---|---|---|---|---|---|
| | $Fe_2O_3$ | $MnO_2$ | $Co_2O_3$ | $Ni_2O_3$ | $Cr_2O_3$ |
| Per cent conversion of butene | 44 | 38 | 30 | 26 | 37 |
| Per cent selectivity to butadiene | 69 | 75 | 64 | 51 | 83 |

One particularly effective catalyst of the above type including the promoter and the stabilizer has the following composition:

| Component | Parts by weight |
|---|---|
| ZnO | 80 |
| $Fe_2O_3$ | 20 |
| $K_2O$ | 5 |
| CuO | 5 |

The above catalysts may conveniently be prepared as follows:

*Example I*

80ZnO—20$Fe_2O_3$—5CuO—5$K_2O$

A solution of 259 grams of ferric nitrate ($Fe(NO_3)_3.9H_2O$)

and 38.7 grams of copper nitrate ($Cu(NO_3)_2.3H_2O$)

in 1 liter of water was stirred into a suspension of 308 grams of zinc subcarbonate in 2 liters of $H_2O$. A solution of 119 grams of $Na_2CO_3$ in 200 cc. of $H_2O$ was added and the precipitate stirred for 2 hours at 80–90° C. The precipitate was filtered, thoroughly washed, and mixed with a solution of 27.4 grams of $KNO_3$ in 200 cc. of $H_2O$. The mixture was dried, heated for 3 hours at 1200° F., and pilled.

*Example II*

80ZnO—20$MnO_2$—5$K_2O$—5CuO

A solution of 262 grams of $MnSO_4.4H_2O$ and 77.2 grams of $Cu(NO_3)_2.3H_2O$ in 2 liters of $H_2O$ was stirred into a suspension of 539 grams of zinc subcarbonate ($2ZnCO_3.3Zn(OH)_2$) in 2 liters of $H_2O$. A solution of 228 grams of $K_2CO_3$ in 400 cc. of $H_2O$ was added and the solution heated for 1 hour at 80–90° C. The precipate was filtered, thoroughly washed, and mixed with a solution of 37.5 grams of $K_2CO_3$ in 200 cc. of $H_2O$. It was dried, heated for 3 hours at 1200° F. and pilled.

The above catalysts possess a high degree of selectivity to the dehydrogenation of normal butene to butadiene, the selectivity being of the order of 70–85%.

In order to set forth the utility of my invention, the following description of tests in which butene-1 was dehydrogenated to form butadiene when employing a zinc oxide base catalyst is set forth below:

*Example III*

A mixture of normal butenes (containing about 95% of butene 2) was passed for one hour at a rate of 800 volumes (normal temperature and pressure) per volume of catalyst per hour with 5600 volumes of steam at 1200° F. over the catalysts whose preparation was described above. Over the ZnO—$Fe_2O_3$—CuO—$K_2O$ catalyst 44% of the butene was converted to other products with 69% selectivity (30.0% butene to butadiene). The amount of carbon deposited on the catalyst was about .2%, and 4.1% of the butene was converted to oxides of carbon (mostly carbon dioxide).

*Example IV*

Under similar conditions the

ZnO—$MnO_2$—CuO—$K_2O$ catalyst gave 38% conversion with 75% selectivity (28.5% of the butene converted to butadiene). Only .3% of the butene was converted to carbon (deposited on the catalyst) and 4.3% was converted to oxides of carbon.

If the temperature is lowered or the feed rate is increased so that the total conversion is reduced to 25%, a selectivity of 80–85% may be obtained.

In carrying out the process using catalysts of the type above described, the hydrocarbon, preferably with steam, is passed over the catalysts at a rate between 50 and 5000, preferably between 100 and 1000 volumes (measured at normal temperature and pressure) of hydrocarbon per volume of catalyst per hour. The ratio of steam to hydrocarbon is between 30:1 and 1:1, preferably from 8:1 to 4:1. The reaction chamber is maintained at a temperature between 1000° and 1600° F., preferably between 1100° and 1300° F. and under atmospheric, below atmospheric, or above atmospheric pressure. The hydrocarbon which passes through the reaction zone was unaffected may of course be recycled thereto.

The principal function of the steam is to dilute the hydrocarbon and thus reduce the partial pressure thereof in the reaction zone. At the same time, however, the steam performs another useful function in that it reacts with coke which may be deposited on the catalyst to form carbon oxides and hydrogen. The elimination of at least a portion of the coke in this manner tends to prolong the time the catalyst can be used before it requires regeneration. Thus the reaction portion of a complete cycle of reaction and regeneration may be as long as 15, 25 or 50 hours or more although it is usually preferable in operation to run for periods of ½ hour to 10 hours and then regenerate.

Regeneration of the catalyst may be effected by shutting off the flow of hydrocarbon and passing steam, air, or a mixture of steam and air through the catalyst mass while it is maintained at a temperature between 1100° F. and 1300° F. Following substantially complete removal of coke from the catalyst in this manner, the flow of hydrocarbon and steam may be resumed.

My present invention may be carried out either in the stationary bed type of operation or a fluid catalyst type of operation. In the former, the catalyst is contained in a case or reactor, and the mixture of steam and hydrocarbon is simply forced through the material, preferably being discharged into the top, forced through the catalyst, and withdrawn from the bottom. The catalyst is preferably in the form of pellets, pills, granules, and the like. In the fluid catalyst type of operation, the catalyst is in the form of a powder having a particle size of from 100 to 400 mesh and is discharged into the reaction zone from a standpipe together with the hydrocarbon to be dehydrogenated, and steam, the catalyst and vapors entering preferably at a point at the bottom of the reactor and passing upwardly through a grid and forming within the reactor a dense phase suspension, that is to say, a suspension of catalyst in the gases of a concentration such that each cubic foot contains from 2 to 35 or more lbs. of catalyst. This dense phase may be formed within the reaction zone above the grid by controlling the linear velocity of gases or vapors by regulating them within the range of say ½ to 8 to 10 ft./sec. Continuity of operation may be thus obtained and the catalyst may be withdrawn through a bottom draw-off pipe regenerated, if necessary, and returned preferably substantially uncooled through the aforementioned standpipe to the reactor. The precise details, however, of operating the reactor do not form an important aspect of my present invention and any known reactor adapted to provide good contact between the solid and gas may be employed.

To recapitulate, my present invention relates to improvements of dehydrogenation catalysts, to the methods of preparing such catalysts, and is characterized briefly by the fact that I employ a zinc oxide base in addition to oxides of iron, manganese, cobalt or nickel and a small amount of a promoter and/or a stabilizer. An outstanding advantage of my invention is that I may carry out the dehydrogenation of a hydrocarbon in the presence of large quantities of steam without injuring the catalyst and thus I may greatly extend the life of catalysts since the presence of steam tends to retard the deposition of hydrocarbon contaminants upon the catalyst. Also, the presence of steam makes it possible to supply the heat necessary for this highly endothermic reaction by the superheating of the said steam at least in substantial part and also makes it possible, particularly with the stationary bed type of operation, to control the contact time since dilution with steam of the entering reactant makes it possible to vary the reaction time virtually to any desired value regardless of how small that contact time interval may be.

What I claim is:

1. An improved method for the catalytic dehydrogenation of hydrocarbons selected from the class of mono-olefins and aralkyls having at least two carbon atoms in the alkyl group which comprises contacting said hydrocarbon diluted with from 1 to 30 volumes of steam per volume of hydrocarbon at temperatures between about 1000° F. and 1600° F. with a catalyst comprising a major portion of zinc oxide and a minor portion of an oxide selected from the class consisting of iron oxide, manganese oxide, cobalt oxide, nickel oxide and chromium oxide and a minor proportion of a promoter comprising potassium oxide.

2. Process set forth in claim 1 in which the hydrocarbon is ethyl benzene.

3. An improved process for the catalytic dehydrogenation of one of the class of hydrocarbons consisting of mono-olefins having not more than six carbon atoms and aralkyls, which comprises contacting said hydrocarbons with a dehydrogenation catalyst at dehydrogenation temperatures, the said catalyst comprising a major proportion of zine oxide and a minor proportion of one of the class consisting of iron oxide, manganese oxide, chromium oxide, cobalt oxide and nickel oxide, and a small amount of potassium oxide employed as a promoter.

4. An improved method for the catalytic dehydrogenation of hydrocarbons selected from the class of mono-olefins and aralkyls having at least two carbon atoms in the alkyl group, which comprises contacting said hydrocarbons diluted with steam at temperatures in the range of from about 1000° F. to 1600° F. with a catalyst consisting essentially of 80 parts by weight of zinc oxide, 20 parts by weight of ferric oxide, 5 parts by weight copper oxide, and 5 parts by weight potassium oxide.

5. The method set forth in claim 1 in which the amount of zinc oxide is from 50–97 parts by weight and the amount of potassium oxide is from 0.5 to 15 parts by weight.

KENNETH K. KEARBY.